(12) United States Patent
Lubratt

(10) Patent No.: US 6,433,951 B1
(45) Date of Patent: Aug. 13, 2002

(54) MAGNETIC DATA STORAGE TAPE WITH ETCHED SERVO PATTERN, METHOD OF MANUFACTURING SAME, AND METHOD OF SERVO POSITIONING ON SAME

(75) Inventor: Mark P. Lubratt, White Bear Lake, MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 09/251,648

(22) Filed: Feb. 17, 1999

(51) Int. Cl.⁷ .............................................. G11B 5/584
(52) U.S. Cl. .................................................... 360/77.12
(58) Field of Search ........................... 360/77.12, 77.03, 360/74.6, 131, 134, 77.08, 121, 25, 77.13; 369/14

(56) References Cited

U.S. PATENT DOCUMENTS

| | | |
|---|---|---|
| 4,315,283 A | 2/1982 | Kinjo et al. |
| 4,645,722 A | 2/1987 | Katayama et al. |
| 4,816,939 A * | 3/1989 | Ford et al. ................ 360/77.03 |
| 4,843,494 A * | 6/1989 | Cronin et al. ............. 360/77.03 |
| 4,961,123 A * | 10/1990 | Williams et al. ...... 360/77.03 X |
| 5,067,039 A | 11/1991 | Godwin et al. |
| 5,089,358 A | 2/1992 | Taki et al. |
| 5,279,775 A | 1/1994 | Thomas et al. |
| 5,283,773 A | 2/1994 | Thomas et al. |
| 5,462,823 A * | 10/1995 | Evans et al. ......... 360/77.03 X |
| 5,619,480 A | 4/1997 | Seo et al. |
| 5,674,583 A | 10/1997 | Nakayama et al. |
| 5,689,384 A | 11/1997 | Albrecht et al. |
| 5,952,074 A * | 9/1999 | Umebayashi et al. ... 360/135 X |
| 6,018,434 A * | 1/2000 | Saliba ..................... 360/77.13 |

FOREIGN PATENT DOCUMENTS

| | | |
|---|---|---|
| JP | 60-070543 | 4/1985 |
| JP | 01-042044 | 2/1989 |
| JP | 03-201215 | 9/1991 |

OTHER PUBLICATIONS

"Timing–Based Track–Following Servo for Linear Tape Systems," Barrett et al., *IEEE Transactions on Magnetics*, vol. 34, No. 4, Jul. 1998, pp. 1872–1877.

* cited by examiner

*Primary Examiner*—David Hudspeth
*Assistant Examiner*—K. Wong
(74) *Attorney, Agent, or Firm*—Eric D. Levinson

(57) ABSTRACT

Magnetic data storage tapes with etched servo patterns are disclosed along with methods of manufacturing the tapes. The servo tracks formed by etching may be read magnetically by magnetically overwriting a pattern etched into a magnetic coating on the tape, followed by detecting the electromagnetic modulation caused by the servo pattern etched into the magnetic coating. The etched servo pattern may also be read optically in addition to magnetically, with the optical writing occurring simultaneously, sequentially or both simultaneously and sequentially. Whether the servo tracks are read magnetically or magnetically and optically, the electromagnetic and/or electromagnetic/optical modulation caused by the etched pattern can be used to accurately position a read/write head on the tape.

23 Claims, 3 Drawing Sheets

MAGNETIC DATA STORAGE TAPE WITH ETCHED SERVO PATTERN, METHOD OF MANUFACTURING SAME, AND METHOD OF SERVO POSITIONING ON SAME

FIELD OF THE INVENTION

The invention relates generally to the etching of servo tracks on magnetic data storage media. More particularly, the present invention relates to etched servo tracks on magnetic data storage tape, methods of forming the etched servo patterns, and methods of positioning read/write heads using the etched servo tracks.

BACKGROUND

Servo patterns are used to control movement of read/write heads over magnetic data storage media where the media is provided in the form of a circular disk or a tape. The servo tracks on conventional data storage tapes are provided by magnetically encoding the magnetic coating provided on the substrate of the media.

One problem with magnetic data storage tapes is that, because the servo tracks are magnetically encoded, bulk erasing of the magnetic data storage tapes not only erases the data stored on the tapes, it also erases the servo-tracks. Erasure of the servo tracks renders the tapes useless for data storage purposes because proper positioning of the read/write heads can no longer be ensured.

Furthermore, the magnetically-encoded servo tracks are formed using specialized servo-track writing equipment. Reformatting of the tapes after, e.g., bulk erasing has destroyed the original servo tracks, typically requires use of the same specialized equipment which is not widely available. As a result, magnetic data storage tapes including magnetic servo tracks are typically discarded after bulk erasure has destroyed the magnetic servo tracks.

Another disadvantage of magnetic servo tracks on magnetic data storage tape is that the equipment required to write the magnetic servo patterns is costly and can only operate at relatively low speeds, thereby limiting throughput.

SUMMARY OF THE INVENTION

The present invention provides magnetic data storage tape with etched patterns in the tape that are used to provide servo tracks. The present invention also includes methods of providing the servo tracks. The servo tracks formed by etching may be read magnetically by magnetically overwriting a pattern etched into a magnetic coating on the tape, followed by detecting the electromagnetic modulation caused by the servo pattern etched into the magnetic coating. The etched servo pattern may also be read optically in addition to magnetically, with the optical writing occurring simultaneously, sequentially or both simultaneously and sequentially. Whether the servo tracks are read magnetically or magnetically and optically, the electromagnetic and/or electromagnetic/optical modulation caused by the etched pattern can be used to accurately position a read/write head on the tape.

Advantages of the present invention include the ability to provide permanent optical servo tracks. Alternatively, if a magnetic servo track is formed in connection with an etched pattern, the present invention provides the ability to reformat magnetic data storage tapes without specialized equipment. That ability to reformat allows users to bulk erase the magnetic data storage tapes without irreversibly destroying the servo tracks because the tapes can be reformatted by magnetically writing over the etched pattern to restore a magnetically encoded servo track to the tape.

In one aspect, the present invention provides a magnetic data storage tape including a magnetic coating on at least one surface of a substrate and a servo pattern including a plurality of etched regions in the magnetic coating on the tape substrate, the plurality of etched regions being spaced apart along a length of the tape. The tape further includes a magnetic signal written over the portion of the tape containing the servo pattern, wherein the magnetic signal and the servo pattern provide electromagnetic modulation to a magnetic read/write head passed over the servo pattern.

In various embodiments, the magnetic data storage tapes may include one servo pattern or a plurality of servo patterns that are spaced apart across a width of the tape. The tapes may include servo patterns in which at least a portion of the magnetic coating in substantially all of each of the plurality of etched regions is removed. Alternatively, each etched region of the plurality of etched regions may be formed by a plurality of stitches in which at least a portion of the magnetic coating is removed. The servo patterns and magnetic signal may provide electromagnetic modulation that is at least about 10% or higher, more preferably at least about 25% or higher, and even more preferably at least about 50% or higher.

In another aspect, the present invention provides a method of manufacturing magnetic data storage tape by providing a substrate with a magnetic coating on at least one surface and etching a servo pattern in the magnetic coating on the tape. The servo pattern includes a plurality of etched regions in the magnetic coating on the tape, the plurality of etched regions being spaced apart along a length of the tape. The method further includes magnetically writing over the portion of the tape containing the servo pattern, wherein the magnetic signal and the etched servo pattern provide electromagnetic modulation to a magnetic read/write head passed over the servo pattern.

In other embodiments, the methods of the present may include forming a plurality of servo patterns in the magnetic coating, the plurality of servo patterns being spaced apart across a width of the tape. The plurality of servo patterns may be formed simultaneously or sequentially. Formation of the servo pattern may also include removing at least a portion of the magnetic coating in substantially all of each of the plurality of etched regions. Alternatively, the etched regions may be formed from a plurality of stitches, wherein at least a portion of the magnetic coating in each of the stitches is removed. The servo patterns and magnetization may provide electromagnetic modulation that is at least about 10% or higher, more preferably at least about 25% or higher, and even more preferably at least about 50% or higher. Furthermore, the magnetic writing may be performed before or after the formation of the servo pattern.

In yet another aspect, the present invention provides a method of servo positioning on a magnetic data storage tape including a magnetic coating on at least one surface of a substrate, a servo pattern comprising a plurality of etched regions in the magnetic coating on the tape, the plurality of etched regions being spaced apart along a length of the tape; and a magnetic signal written over the servo pattern. The method includes detecting electromagnetic modulation in the magnetic coating by passing a magnetic core over the servo pattern and detecting optical modulation by passing an optical read head over the servo pattern. A magnetic read/write head is then positioned based on the electromagnetic and optical modulation detected.

In various embodiments, the electromagnetic modulation and the optical modulation can be detected simultaneously or sequentially. The electromagnetic modulation and the optical modulation may be detected using the same servo pattern or they may be detected using different servo patterns.

These and other features and advantages of the present invention are described more completely below in connection with the illustrated embodiments presented.

DETAILED DESCRIPTION OF ILLUSTRATIVE EMBODIMENTS OF THE INVENTION

Figure 1:
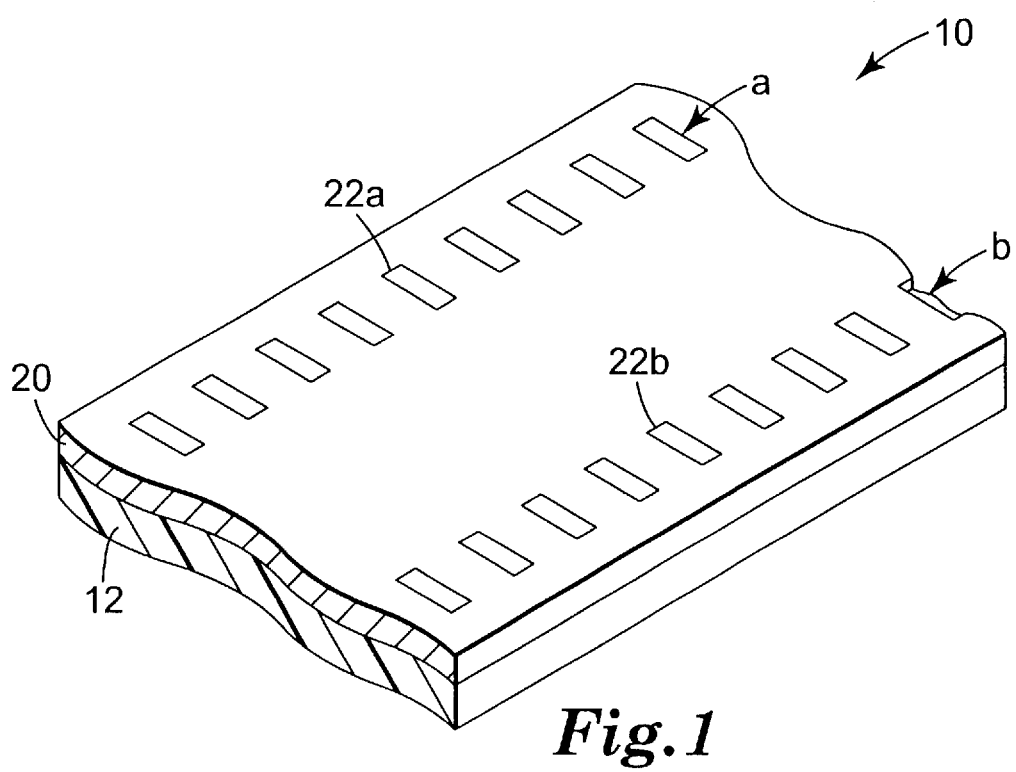
FIG. 1 is a perspective view of a magnetic data storage tape including a plurality of etched servo patterns formed thereon.

The present invention provides magnetic data storage tape with one or more etched servo patterns formed thereon. FIG. 1 illustrates one magnetic data storage tape 10 according to the present invention. The tape 10 includes a substrate 12 with a magnetic coating 20 on at least one surface of the substrate 12. The substrate 12 may be formed of any suitable material as will be known to those skilled in the art. The magnetic coating 20 may also be any suitable magnetic coating used in magnetic data storage tapes.

Also, it should be understood that although the magnetic coating 20 and substrate 12 are illustrated as homogenous layers, one or both of the magnetic coating 20 and substrate 12 could be provided as composites of multiple layers of the same or different materials. For example, the substrate 12 may include a base layer of, e.g., polyester, coated with non-magnetic materials on one or both sides. Such a composite is considered to be included within the term "substrate" as used in connection with the present invention. Furthermore, multiple magnetic coatings could be provided on the substrate, with at least some of the magnetic coatings being separated by non-magnetic layers. In addition, the substrate could be provided with magnetic coatings on both of its major sides. Other variations in the exact construction of the media used in connection with the present invention will be known to those skilled in the art of magnetic data storage.

The tape 10 includes two servo patterns a, b formed in the magnetic coating 20 on the substrate 12. Each of the servo patterns a, b is formed by a plurality of etched regions 22a, 22b (collectively referred to as etched regions 22) that are aligned along the length of the tape 10. The servo patterns a, b are preferably spaced apart across the width of the tape 10, with the area between the servo patterns a, b being used for data storage. Although the servo patterns are illustrated as being etched into the magnetic coating 20, it will be understood that they could alternatively, be formed in the substrate 12.

Also, although the illustrated patterns are one example of a dedicated servo pattern, it will be understood that the present invention could be implemented in any suitable servo system, e.g., embedded servo patterns, etc. Furthermore, although the illustrated pattern is uniformly repeating along the length of the tape, it will be understood that the pattern or patterns formed according to the present invention could vary along the length of the tape and/or transverse to the length of the tape. In addition, the present invention can be used in connection with boundary servo systems or timing based servo systems.

The servo patterns a, b may be read optically, magnetically or both optically and magnetically. If the servo patterns a, b are to be read optically, they may be formed on any appropriate surface of the tape 10. For example, the servo patterns a, b may be formed in a magnetic coating 20 on the tape 10, or they may be formed on another surface, e.g., in the substrate 12. Alternatively, the servo patterns a, b may be formed in another coating provided on the tape 10 that is selected for its ability to provide an optical servo track with enhanced contrast (e.g., a material that provides high contrast). Wherever formed, the servo patterns to be read optically must exhibit sufficient optical modulation when read by an optical read head to provide accurate positioning information.

Servo patterns a, b that are to be read magnetically must be formed in a magnetic coating that is magnetized using a magnetic signal such that the servo patterns can be magnetically read. For example, the servo patterns may be overwritten with a magnetic signal in the form of magnetic tone, a constant magnetic field, etc. If the servo patterns a, b formed in the magnetic coating 20 on the tape 10 are magnetically overwritten, then the servo patterns a, b on the tape 10 and magnetization combine to form servo tracks that provide electromagnetic modulation when read by a magnetic core. The electromagnetic modulation provided by the servo tracks can then be used to provide the desired servo information needed to accurately position the read/write heads during data storage and retrieval.

In those systems in which the servo positioning will be accomplished by a combination of magnetic and optical servo patterns, the same servo pattern may be used to position both magnetically and optically, provided that the servo pattern provides both sufficient electromagnetic and optical modulation. Alternatively, different servo patterns could be used to provide the desired electromagnetic and optical modulation. For example, servo pattern a could be used to provide electromagnetic modulation to a magnetic core while servo pattern b could be used to provide optical modulation. The different patterns could be read simultaneously, sequentially or a combination of simultaneously and sequentially.

The electromagnetic modulation in the servo tracks is caused by the alternating regions 22, in which at least portion of the magnetic coating 20 is removed, and the unaffected magnetic coating 20 between regions 22 along the length of each of the servo patterns a, b. The unaffected magnetic coating 20 retains the magnetization to a greater degree than the etched regions 22 because at least a portion of the magnetic coating 20 in each etched region 22 has been removed, thereby reducing the ability of the tape 10 to retain magnetization by reducing the magnetic moment Alternatively, the etched regions can provide electromagnetic modulation by increasing separation distance between the magnetic core and the magnetic coating as compared to the areas that are not etched.

Figure 2:
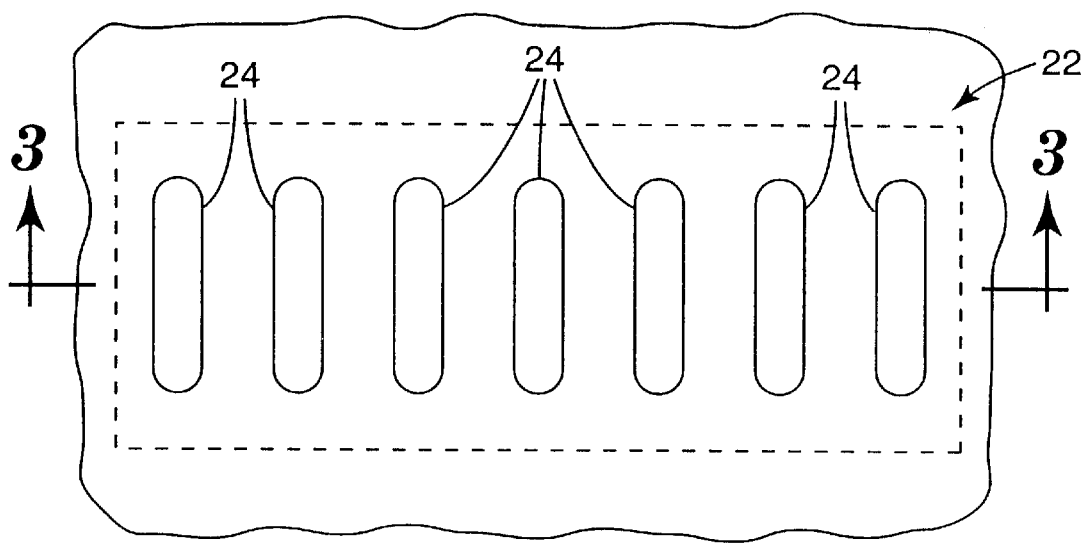
FIG. 2 is an enlarged plan view of one etched region of a servo pattern.

Although each etched region 22 may be formed as a single etched area, it may be helpful to provide each etched region 22 in the form of a plurality of stitches 24 located within the etched region 22 as illustrated in FIG. 2. If all of the magnetic coating 20 is removed within each of the etched regions 22, the ability to control the height of the read/write head above the tape 10 can be adversely affected. By providing the etched regions 22 as a plurality of spaced apart stitches 24, however, the proper height of the read/write head above the tape 10 may be more easily maintained.

Figure 3:
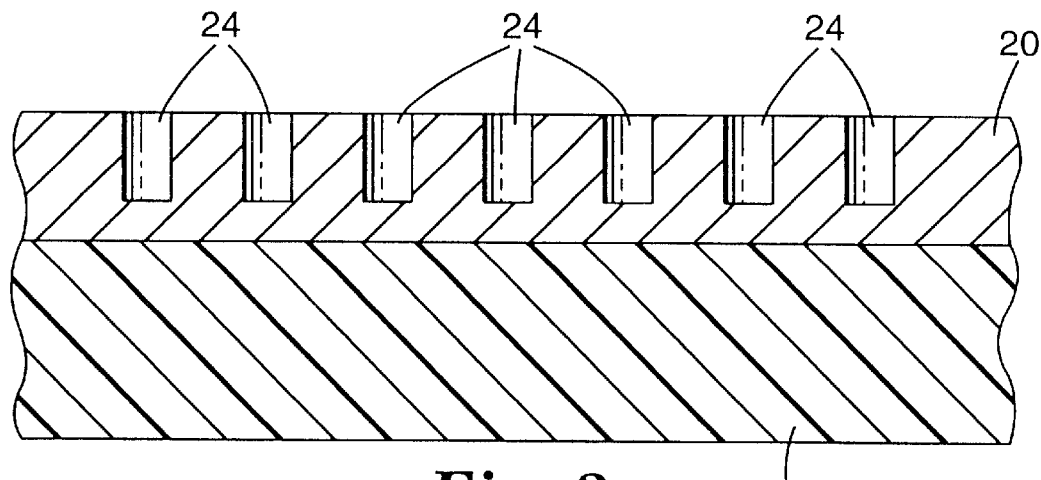
FIG. 3 is a cross-sectional view of the etched region of FIG. 2 taken along line 3—3 in FIG. 2.

Another variation in the amount of the magnetic coating 20 removed within the etched areas 22 is illustrated in FIG. 3, which is a cross-sectional view of FIG. 2 taken along line 3—3 in FIG. 2. The additional variable illustrated in FIG. 3 is the depth to which the magnetic coating 20 is removed from the tape 10. As illustrated in FIG. 3, it may be preferred that a portion of the magnetic coating 20 between each stitch 24 and the substrate 12 remain after etching.

Figure 3A:
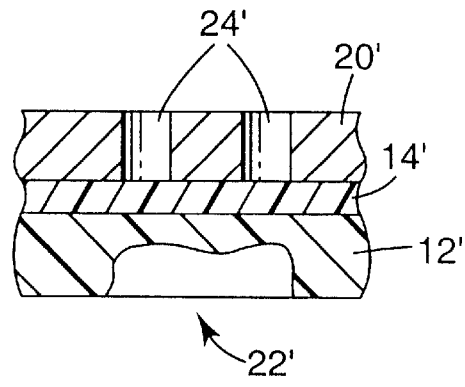
FIG. 3A is an enlarged partial cross-sectional view of one etched magnetic data storage tape.

FIG. 3A illustrates another alternative tape construction in which substantially all of the magnetic coating 20' in each stitch 24' is removed from the tape 10'. The tape 10' also includes an intermediate layer 14' between the magnetic coating 20' and substrate 12' that can be selected to enhance removal of the magnetic coating 20'. For example, the intermediate layer 14' may be selected for its optical properties (e.g., reflection, absorption, etc.) when the etching is performed using laser energy.

FIG. 3A also illustrates an etched region 22' formed in the substrate 12' on the opposite side of the magnetic coating 20'. The etched region 22' could be used in connection with an optical servo pattern as discussed above.

Regardless of the actual form of each etched region in the servo patterns, one important function of the etched regions is to reduce the magnetic properties of selected areas on the tape to provide electromagnetic modulation after signal overwriting. That signal modulation should be significant enough to be accurately detected by a magnetic core. As a result, the exact dimensions of and spacing between the etched regions can vary based on a number of factors including, but not limited to: the properties of the magnetic coating on the substrate, the properties of the core on the read heads, etc.

It may be preferred that the etched regions provide enough deformation or destruction in the magnetic coating on the tape such that electromagnetic modulation of at least about 10% or higher in magnetization written over the servo patterns a, b is obtained when read back by a magnetic core. More preferably, the modulation provided by the servo tracks is at least about 25% or higher, and even more preferably the modulation is at least about 50% or higher.

The formation of the etched regions on the magnetic data storage tape is preferably accomplished by providing a magnetic data storage tape including a substantially continuous magnetic coating on a substrate. The tape is then processed to form the etched regions in a pattern that can be read optically or magnetically. The etching is preferably performed by laser ablation, although any suitable technique for selectively removing at least a portion of the magnetic coating can be used in place of or in connection with laser ablation. The etched regions can alternatively be formed by, e.g., contact lithography, chemical etching, etc.

Figure 4:
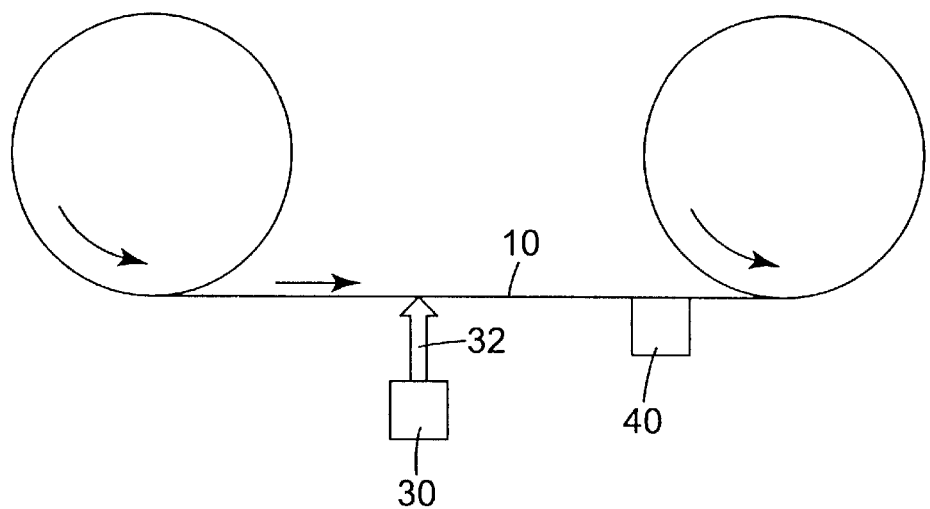
FIG. 4 illustrates one method of providing a servo track on magnetic data storage tape according to the present invention.

FIG. 4 illustrates one system for providing a servo tracks on magnetic data storage tape. The system includes a source 30 of laser energy that provides a focused beam 32 of laser energy directed at the tape 10. The tape 10 is preferably moved relative to the beam 32 which is modulated to produce the desired servo pattern of spaced-apart etched regions needed to form a servo track on the tape 10. Those skilled in the art of laser ablation processing will understand that some method of debris removal will also be used to control the debris generated by the preferred ablation process. For example, a frozen carbon dioxide cleaning system and/or vacuum may be used to control debris removal.

Also illustrated in FIG. 4 is a magnetic write head 40 used to magnetize at least the area of the servo track or tracks formed on the tape 10. The magnetization may be performed before or after the etching is completed, although it preferably is performed after etching as illustrated in FIG. 4. It will be understood that, although illustrated as being performed in-line with the etching, the magnetization may be accomplished in a separate process that is not performed in-line with etching.

Figure 5:
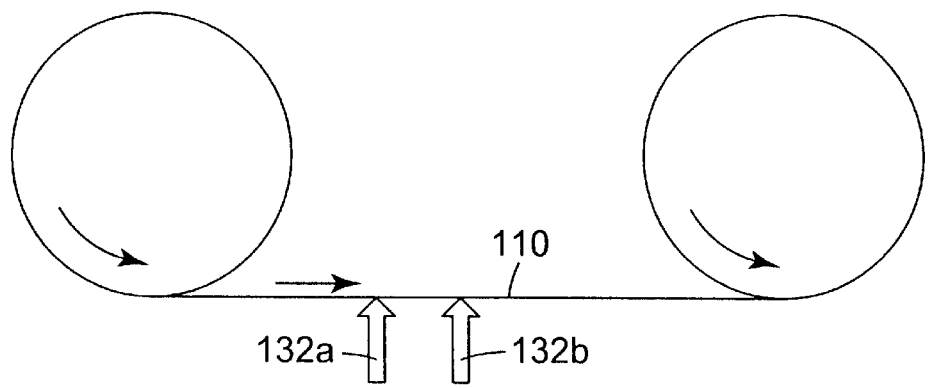
FIG. 5 illustrates a method of providing a plurality of servo tracks on magnetic data storage tape according to the present invention.

Another variation in the methods of producing an etched magnetic data storage tape 110 is illustrated in FIG. 5. This variation involves the simultaneous formation of a plurality of etched servo track patterns on a tape 110. To do so in, e.g., a process using laser energy to etch the magnetic coating on the tape 110, a plurality of the laser beams 132a and 132b may be directed at the tape 110. The beams 132a and 132b may come from a single laser in which the output beam is divided, or the beams 132a and 132b may come from different lasers.

Figure 6:
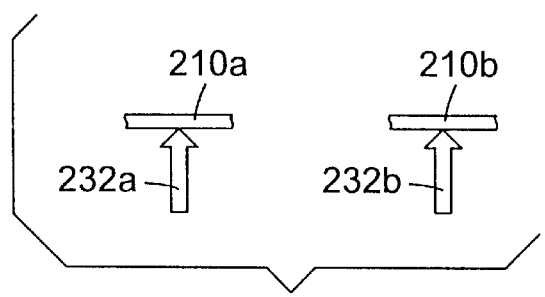
FIG. 6 illustrates a method of providing servo tracks on two magnetic data storage tapes according to the present invention.

Yet another variation is illustrated in FIG. 6, in which servo patterns are simultaneously etched into a plurality of magnetic data storage tapes 210a and 210b using etching beams 232a and 232b. The etching beams 232a and 232b may come from a single laser in which the output beam is divided, or the beams 232a and 232b may come from different lasers.

Systems and methods for the simultaneous etching of a plurality of servo tracks on one magnetic data storage tape or on a plurality of tapes are described in commonly assigned, copending U.S. patent application Ser. No. 09/251,774, filed on even date herewith.

Although a limited number of illustrative embodiments are described above, various modifications and alterations of this invention will become apparent to those skilled in the art without departing from the scope of this invention, and it should be understood that this invention is not to be unduly limited to the illustrative embodiments and methods set forth herein.

What is claimed is:

1. A magnetic data storage tape comprising:
    a magnetic coating on at least one surface of a substrate;
    a plurality of servo tracks, wherein each servo track comprises a plurality of etched regions in the magnetic coating of the tape, the plurality of etched regions being spaced apart along a length of the tape, and wherein the plurality of servo tracks are spaced apart across a width of the tape; and
    a magnetic signal written over each servo track, wherein the magnetic signal and each servo track provide electromagnetic modulation to a magnetic core passed over each servo track.

2. A magnetic data storage tape according to claim 1, wherein at least a portion of the magnetic coating in substantially all of each of the plurality of etched regions is removed.

3. A magnetic data storage tape according to claim 1, wherein each etched region of the plurality of etched regions comprises a plurality of stitches in which at least a portion of the magnetic coating is removed.

4. A magnetic data storage tape according to claim 1, wherein the electromagnetic modulation is at least about 10% or higher.

5. A magnetic data storage tape according to claim 1, wherein the electromagnetic modulation is at least about 25% or higher.

6. A magnetic data storage tape according to claim 1, wherein the electromagnetic modulation is at least about 50% or higher.

7. A magnetic data storage tape according to claim 1, further comprising an intermediate layer between the magnetic coating and the substrate, the intermediate layer exhibiting at least one selected optical property.

8. A method of manufacturing magnetic data storage tape comprising:
  providing a substrate with a magnetic coating on at least one surface;
  etching a plurality of servo tracks in the magnetic coating on the tape, servo pattern comprising a plurality of etched regions, the plurality of etched regions being spaced apart along a length of the tape, wherein the plurality of servo tracks are spaced apart across a width of the tape; and
  writing a magnetic signal over each servo track, wherein the magnetic signal and each servo track provide electromagnetic modulation to a magnetic core passed over each servo track.

9. A method according to claim 8, wherein the plurality of servo tracks are formed simultaneously.

10. A method according to claim 8, wherein the plurality of servo tracks are formed sequentially.

11. A method according to claim 8, wherein forming the servo track further comprises removing at least a portion of the magnetic coating in substantially all of each of the plurality of etched regions.

12. A method according to claim 8, wherein forming the servo track further comprises forming a plurality of stitches each of the etched regions, wherein at least a portion of the magnetic coating in each of the stitches is removed.

13. A method according to claim 8, wherein the etching is performed by laser ablation.

14. A method according to claim 8, wherein the electromagnetic modulation is at least about 10% or higher.

15. A method according to claim 8, wherein the electromagnetic modulation is at least about 25% or higher.

16. A method according to claim 8, wherein the electromagnetic modulation is at least about 50% or higher.

17. A method according to claim 8, wherein the magnetic signal is written on the tape after the plurality of servo tracks are formed.

18. A method according to claim 8, wherein the magnetic signal is written on the tape before the plurality of servo tracks are formed.

19. A method of servo positioning on a magnetic data storage tape comprising:
  providing a magnetic data storage tape comprising a magnetic coating on at least one surface of a substrate, a servo pattern comprising a plurality of etched regions in the magnetic coating on the tape, the plurality of etched regions being spaced apart along a length of the tape; and a magnetic signal written over the servo pattern;
  detecting electromagnetic modulation in the magnetic coating by passing a magnetic core over the servo pattern;
  detecting optical modulation by passing an optical read head over the servo pattern; and
  positioning a magnetic read/write head based on the electromagnetic modulation and the optical modulation.

20. A method according to claim 19, wherein the electromagnetic modulation and the optical modulation are detected simultaneously.

21. A method according to claim 19, wherein the electromagnetic modulation and the optical modulation are detected sequentially.

22. A method according to claim 19, wherein the electromagnetic modulation and the optical modulation are detected using the same servo pattern.

23. A method according to claim 19, wherein the tape comprises a plurality of servo patterns, and further wherein the electromagnetic modulation and the optical modulation are detected using different servo patterns.

* * * * *

UNITED STATES PATENT AND TRADEMARK OFFICE
CERTIFICATE OF CORRECTION

PATENT NO. : 6,433,951 B1 Page 1 of 1
DATED : August 13, 2002
INVENTOR(S) : Mark P. Lubratt, Robert C. Martin and Richard W. Molstad It is certified that error appears in the above-identified patent and that said Letters Patent is hereby corrected as shown below:

Title page,
Item [75], after Inventor, "Mark P. Lubratt, White Bear Lake, MN (US), please add:
-- Robert C. Martin, Stillwater, MN (US); Richard W. Molstad, St. Paul, MN (US) --

Signed and Sealed this

Twentieth Day of April, 2004

JON W. DUDAS
*Acting Director of the United States Patent and Trademark Office*